US010360838B2

United States Patent
Choi et al.

(10) Patent No.: US 10,360,838 B2
(45) Date of Patent: Jul. 23, 2019

(54) DISPLAY DEVICE AND POWER DELIVERY SYSTEM INCLUDING THE SAME

(71) Applicant: SAMSUNG DISPLAY CO., LTD., Yongin-si, Gyeonggi-do (KR)

(72) Inventors: Kyung-uk Choi, Yongin-si (KR); Seokyun Son, Yongin-si (KR); Joon-chul Goh, Yongin-si (KR); Kyungyul Kim, Yongin-si (KR); Seohyeong Yang, Yongin-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 121 days.

(21) Appl. No.: 15/597,519

(22) Filed: May 17, 2017

(65) Prior Publication Data

US 2017/0345361 A1 Nov. 30, 2017

(30) Foreign Application Priority Data

May 27, 2016 (KR) .......................... 10-2016-0065894

(51) Int. Cl.
*G09G 3/20* (2006.01)
*G06F 3/147* (2006.01)

(52) U.S. Cl.
CPC ............ *G09G 3/2092* (2013.01); *G06F 3/147* (2013.01); *G09G 3/20* (2013.01); *G09G 2330/021* (2013.01); *G09G 2370/06* (2013.01)

(58) Field of Classification Search
CPC .............. G09G 3/2092; G09G 2370/06; G09G 2330/021; G09G 3/20; G06F 3/147
See application file for complete search history.

(56) References Cited

U.S. PATENT DOCUMENTS

| 5,814,972 A | * | 9/1998 | Shimada | H02J 9/061 320/132 |
| 6,665,801 B1 | * | 12/2003 | Weiss | G06F 1/266 713/300 |
| 7,010,703 B1 | * | 3/2006 | Kobayashi | H04L 12/10 713/300 |

(Continued)

FOREIGN PATENT DOCUMENTS

KR 10-0480017 B1 3/2005
KR 10-2009-0113016 A 10/2009

(Continued)

*Primary Examiner* — Grant Sitta
(74) *Attorney, Agent, or Firm* — Lee & Morse, P.C.

(57) ABSTRACT

A display device includes an interface, a power supply, a switch arrangement, and a display. The interface is driven by driving power and receives image data from an external source. The power supply generates first and second power based on a first input power in a first mode and delivers the driving power to the interface in the first mode. The switch arrangement forms a first delivery path to deliver the first power from the power supply to the interface in the first mode The display receives the second power from the power supply when driven in the first mode and receives the image data from the interface. The switch arrangement forms a second delivery path to deliver second input power to the power supply in a second mode when the interface receives the second input power from the external source in the second mode.

15 Claims, 7 Drawing Sheets

(56) References Cited

U.S. PATENT DOCUMENTS

| | | | | |
|---|---|---|---|---|
| 7,589,536 B2* | 9/2009 | Terlizzi | G06F 13/385 | |
| | | | 324/527 | |
| 7,631,111 B2* | 12/2009 | Monks | H04L 12/10 | |
| | | | 710/15 | |
| 7,843,084 B2* | 11/2010 | Wang | H02J 1/108 | |
| | | | 307/80 | |
| 8,161,298 B2* | 4/2012 | Kubo | H02J 1/14 | |
| | | | 359/17 | |
| 8,332,545 B1* | 12/2012 | Monks | G06F 13/4291 | |
| | | | 710/14 | |
| 8,626,932 B2* | 1/2014 | Lydon | G06F 13/385 | |
| | | | 709/228 | |
| 8,843,770 B2* | 9/2014 | Ghosh | G06F 1/266 | |
| | | | 713/300 | |
| 8,898,488 B2* | 11/2014 | Lin | G06F 1/266 | |
| | | | 713/300 | |
| 9,116,678 B2* | 8/2015 | Zeung | G06F 13/385 | |
| 9,898,436 B2* | 2/2018 | Chang | G06F 13/4068 | |
| 2004/0042138 A1* | 3/2004 | Saito | G06F 1/263 | |
| | | | 361/90 | |
| 2005/0253560 A1* | 11/2005 | Popescu-Stanesti | H02J 1/08 | |
| | | | 320/138 | |
| 2006/0036885 A1* | 2/2006 | Hsieh | G06F 1/1601 | |
| | | | 713/300 | |
| 2006/0045112 A1* | 3/2006 | Laiho | G06F 1/1632 | |
| | | | 370/419 | |
| 2007/0022311 A1* | 1/2007 | Park | G06F 1/266 | |
| | | | 713/310 | |
| 2007/0220290 A1* | 9/2007 | Tsai | G06F 1/266 | |
| | | | 713/300 | |
| 2008/0229124 A1* | 9/2008 | Kubo | H02J 1/14 | |
| | | | 713/300 | |
| 2009/0115384 A1* | 5/2009 | Venes | H02M 3/158 | |
| | | | 323/280 | |
| 2010/0070659 A1* | 3/2010 | Ma | G06F 13/385 | |
| | | | 710/14 | |
| 2010/0097030 A1* | 4/2010 | Kim | G06F 1/1601 | |
| | | | 320/106 | |
| 2010/0161869 A1* | 6/2010 | Uchida | G06F 1/266 | |
| | | | 710/313 | |
| 2011/0016253 A1* | 1/2011 | Kakish | G06F 13/385 | |
| | | | 710/313 | |
| 2012/0139474 A1* | 6/2012 | Cho | G09G 3/2092 | |
| | | | 320/106 | |
| 2012/0151231 A1* | 6/2012 | Hatta | G06F 1/266 | |
| | | | 713/320 | |
| 2012/0300526 A1* | 11/2012 | Chuang | H02J 9/005 | |
| | | | 363/146 | |
| 2013/0175977 A1* | 7/2013 | Tinaphong | H02J 7/0052 | |
| | | | 320/107 | |
| 2014/0312701 A1* | 10/2014 | Hong | H02J 7/008 | |
| | | | 307/80 | |
| 2015/0198989 A1* | 7/2015 | Hayter | G06F 1/263 | |
| | | | 713/340 | |
| 2015/0338881 A1* | 11/2015 | Hsu | G06F 13/4081 | |
| | | | 710/304 | |
| 2016/0004287 A1* | 1/2016 | Qiu | H01R 24/62 | |
| | | | 713/300 | |
| 2017/0309221 A1* | 10/2017 | Yang | G09G 3/2096 | |

FOREIGN PATENT DOCUMENTS

| | | |
|---|---|---|
| KR | 10-2015-0005030 A | 1/2015 |
| WO | WO 2015/079215 A1 | 6/2015 |

* cited by examiner

DISPLAY DEVICE AND POWER DELIVERY SYSTEM INCLUDING THE SAME

CROSS-REFERENCE TO RELATED APPLICATIONS

Korean Patent Application No. 10-2016-0065894, filed on May 27, 2016, and entitled, "Display Device and Power Delivery System Including the Same," is incorporated by reference herein in its entirety.

BACKGROUND

1. Field

One or more embodiments described herein relate to a display device and power deliver system including a display device.

2. Description of the Related Art

A display device may be driven based on power at a predetermined level from an external device or external power supply, e.g., a power adapter. In one arrangement, a universal serial bus supplies power and data to the display device. However, power from the external supply or device may not always be provided in a way that allows for stable driving of the display device. This is because, for example, a connector to which the external device or supply is connected supplies power at less than the predetermined level, and without additional external power.

SUMMARY

In accordance with one or more embodiments, a display device includes an interface to be driven by driving power and to receive image data from an external source; a power supply to generate first power and second power based on a first input power in a first mode, the power supply to supply the first power as the driving power to the interface, the first input power to be received from an external power supply in the first mode; and a switch arrangement to form a first delivery path to deliver the first power from the power supply to the interface in the first mode; and a display to receive the second power from the power supply and to be driven in the first mode and receive the image data from the interface to display an image, wherein the switch arrangement is to form a second delivery path to deliver a second input power to the power supply in a second mode when the interface receives the second input power from the external source, the driving power to be received from the external source in the second mode.

The switch arrangement may include a first switch between an output terminal of the power supply and an input terminal of the interface, the first switch to be turned on in the first mode to form the first delivery path; and a second switch between an output terminal of the interface and an input terminal of the power supply, the second switch to be turned on in the second mode to form the second delivery path.

The interface may start an operation based on an operation start power; the power supply may generate a third power from the first input power in the first mode; and the switch arrangement may include a third switch to form a third delivery path to deliver the third power as the operation start power to the interface, when the third switch is turned on. When an operation starts based on the third power, the interface may receive a power supply signal from the external source and request a power supply corresponding to the power supply signal from the power supply; the power supply may generate a fourth power from the first input power and deliver the fourth power as the power supply to the interface through the first delivery path; and the interface may deliver the fourth power to the external source.

The third switch may be turned off and the interface is to receive the operation start power from the external source in the second mode. The interface may be driven based on the driving power from the external source in the second mode and is to transmit a request signal to request the second input power to the external source.

When the second input power is provided from the external source to the interface based on the request signal, the power supply may generate a fifth power from the second input power received through the second delivery path and the display is to be driven based on the fifth power from the power supply. When the interface receives a default power less than the second input power based on the request signal, the first switch and the second switch may be turned off.

The display device may include an input switch to be turned on in the first mode, wherein the second switch is to be turned off when the input switch is turned on, even when the second switch receives the second input power from the external source in the first mode. The interface may include a connector to electrically connect the external source and the interface, e connector including at least one terminal to receive the driving power and the second input power, and a terminal to receive the image data.

In accordance with one or more other embodiments, a power delivery system includes an external power supply to supply a first input power; an external source to provide image data; and a display including: a power supply to generate a first power and a second power from the first input power in a first mode, to receive the first input power from the external power supply, an interface to be driven by a driving power and to receive the image data from the external source, a switch arrangement to form a first delivery path to deliver the first power as the driving power from the power supply to the interface in the first node, and a display to receive the second power from the power supply and to be driven in the first mode and receive the image data from the interface to display an image, wherein in a second mode to receive the driving power from the external source, the switch arrangement is to form a second delivery path to deliver the second input power to the power supply when the interface receives a second input power from the external source.

The switch arrangement may include a first switch between an output terminal of the power supply and an input terminal of the interface, the first switch to be turned on in the first mode to form the first delivery path; and a second switch between an output terminal of the interface and an input terminal of the power supply, the second switch to be turned on in the second mode to form the second delivery path.

The interface may start an operation by an operation start power; the power supply may generate a third power from the first input power in the first mode; and the switch arrangement may include a third switch to form a third delivery path to deliver the third power as the operation start power to the interface, when the third switch is turned on.

When an operation starts based on the third power, the interface may receive a power supply signal from the external source and is to request a power supply corresponding to the power supply signal from the power supply; the power supply may generate a fourth power from the first input power and to deliver the fourth power as the power supply to the interface through the first delivery path; and the interface may deliver the fourth power to the external source. The third switch may be turned off and the interface is to receive the operation start power from the external source in the second mode. The interface may be driven by the driving power from the external source in the second mode and is to transmit a request signal to request the second input power to the external source.

The external source may deliver the second input power to the interface based on the request signal; the second switch may be turned on to deliver the second input power from the interface to the power supply; and the power supply may generate a fifth power to drive the display based on the second input power. The interface may electrically connect the external source and interface, and the interface may include a connector having a terminal to receive the image data from the external source and at least one terminal to receive the driving power and the second input power. When connected to the display, the external source may receive driving interface information of the display and to transmit data, which is converted to match the driving interface information, as the image data to the display.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 1:
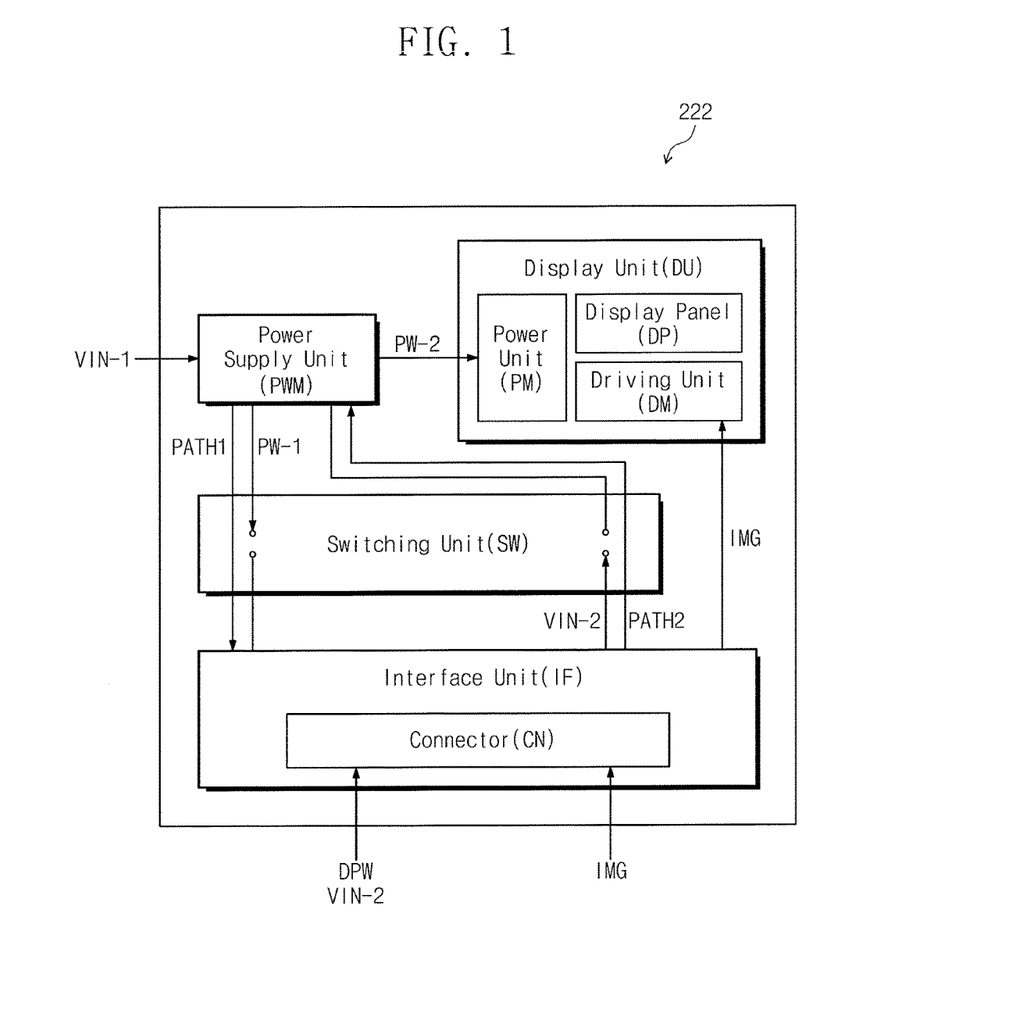
FIG. 1 illustrates an embodiment of power flow for a display device.

FIG. 1 is a block diagram illustrating the power flow of a display device DD according to an embodiment of the invention. Referring to FIG. 1, the display device DD according to an embodiment of the invention may include a power supply unit (e.g., power supply) PWM, an interface unit (e.g., interface) IF, a display unit DU, and a switching unit (e.g., switching circuit) SW.

The power supply unit PWM may receive a power of more than a predetermined magnitude required for driving the display device DD from an external power supply. For example, the external power supply may be a power received from a power adapter. However, the invention is not limited thereto, and the external power supply may include all kinds of electronic devices for supplying a power of more than a predetermined magnitude. Hereinafter, for convenience of description, a power of more than a predetermined magnitude received from an external power supply is referred to as a first input power VIN-1.

The power supply unit PWM may convert the first input power VIN-1 into powers of appropriate levels for each of components in the display device DD. As one example, the first input power VIN-1 may be used to generate a plurality of powers required for driving each component of the display device DD. As a more specific example, the power supply unit PWM may generate a first power PW-1 for driving the interface unit IF and a second power PW-2 for driving the display unit DU, from the first input power VIN-1. Although not shown in the drawing, the power supply unit PWM may generate a third power from the first input power VIN-1, as an operation start power for starting an operation of the interface unit IF.

The power supply unit PWM may distribute a plurality of powers generated from the first input power VIN-1 to each corresponding component among components in the display device DD. Although not shown in the drawing, the power supply unit PWM may further include a charging battery for storing a part of the first input power VIN-1.

The interface unit IF according to an embodiment of the invention may start an operation by an operation start power and may be driven by a drive power. For example, the interface unit IF according to an embodiment of the invention may start an operation by a third power delivered from the power supply unit PWM and may be driven by a first power PW-1 delivered from the power supply unit PWM.

When an external device is connected to the display device DD, the interface unit IF may exchange information or power with the external device. The external device, for example, may be a jump drive, a computing device (e.g., desktop or laptop computer), or various peripheral devices such as a printer, a modem, or the like. In addition, information that the interface unit IF exchanges with an external device may include, for example, signals including information on power, image data IMG relating to an image to be output from the display device DD, and/or control data for controlling the image data IMG.

The interface unit IF may include a connector CN that connects an external device with the interface unit IF. When an external device is connected, the connector CN may serve as a path for delivering information and power levels between the interface unit IF and the external device.

The connector CN may include a plurality of terminals for performing one or more operations relating to an external device. For example, the connector CN may include a terminal for detecting the connection of an external device, a terminal for transmitting/receiving information on an external device and power, a terminal for transmitting power to an external device and receiving power from an external device, and/or a terminal for receiving image data from an external device. For example, the connector CN includes at least one terminal for receiving driving power DPW and second input power VIN-2 from an external device, and a terminal for receiving image data IMG.

The connector CN may include a plurality of terminals for receiving power, for example, of more than a predetermined magnitude from an external device. In one embodiment, the connector CN of the display device DD may be a universal serial bus (USB) type-c connector CN.

The interface unit IF may include a power interface unit and a data interface unit. The power interface unit exchanges signals (including power information) with an external device and transmits/receives power and one or more levels to/from an external device based on various signals. The data interface unit delivers image data received from an external device and control data to the display unit DU.

The display unit DU may include a display panel DP, a driving unit DM, and a power unit PM. The display panel DP may output an image based on image data. The display panel DP may be, for example, a light-receiving type display panel (such as a liquid crystal display panel, a plasma display panel, an electrophoretic display panel, a MEMS display panel, and an electrowetting display panel) or a self light emitting type display panel including, for example, an organic light emitting diode elements.

The driving unit DM of the display unit DU may control the display panel DP to receive the image data IMG and control data from the interface unit IF and to output an image corresponding to the image data IMG based on the control data. In addition, the power unit PM may receive the second power PM-2 for driving the display unit DU from the power supply unit PWM.

The switching unit SW may form power delivery paths for controlling power flow between the power supply unit PWM and the interface unit IF. The switching unit SW may form power delivery paths between the power supply unit PWM and the interface unit IF according to the power supply mode of the display device DD. For example, when the display device DD is in a first mode, the switching unit SW may form a first delivery path PATH1 for delivering first power PW-1 from the power supply unit PWM to the interface unit IF. The first mode may be a mode when the first input power VIN-1 is received from an external power supply to the power supply unit PWM.

When the display unit DD is in a second mode, the switching unit SW may form a second delivery path PATH2 through which the interface unit IF delivers the second input power VIN-2 from an external device to the power supply unit PWM. The second mode may be a mode when predetermined power is received from an external device connected to the display device DD. The second mode may be, for example, a mode when the operation start power or driving power of the interface unit IF is received from an external device connected to the display device DD.

The first delivery path PATH1 and the second delivery path PATH2 may be selectively formed. For example, the switching unit SW may form only the first delivery path PATH1 in the first mode in which the first input power VIN-1 is received by the power supply unit PWM, and this is so even when the second input power VIN-2 is received from an external device to the interface unit IF. When the interface unit IF is driven by driving power from an external device in the situation where input power of more than a predetermined magnitude is not supplied from an external power supply to the power supply unit PWM, the switching unit SW may form only the second delivery path PATH2. Accordingly, display device DD may be driven by performing selective switching when power is supplied from an external power supply and power at a predetermined level is supplied from an external device.

Figure 2A:
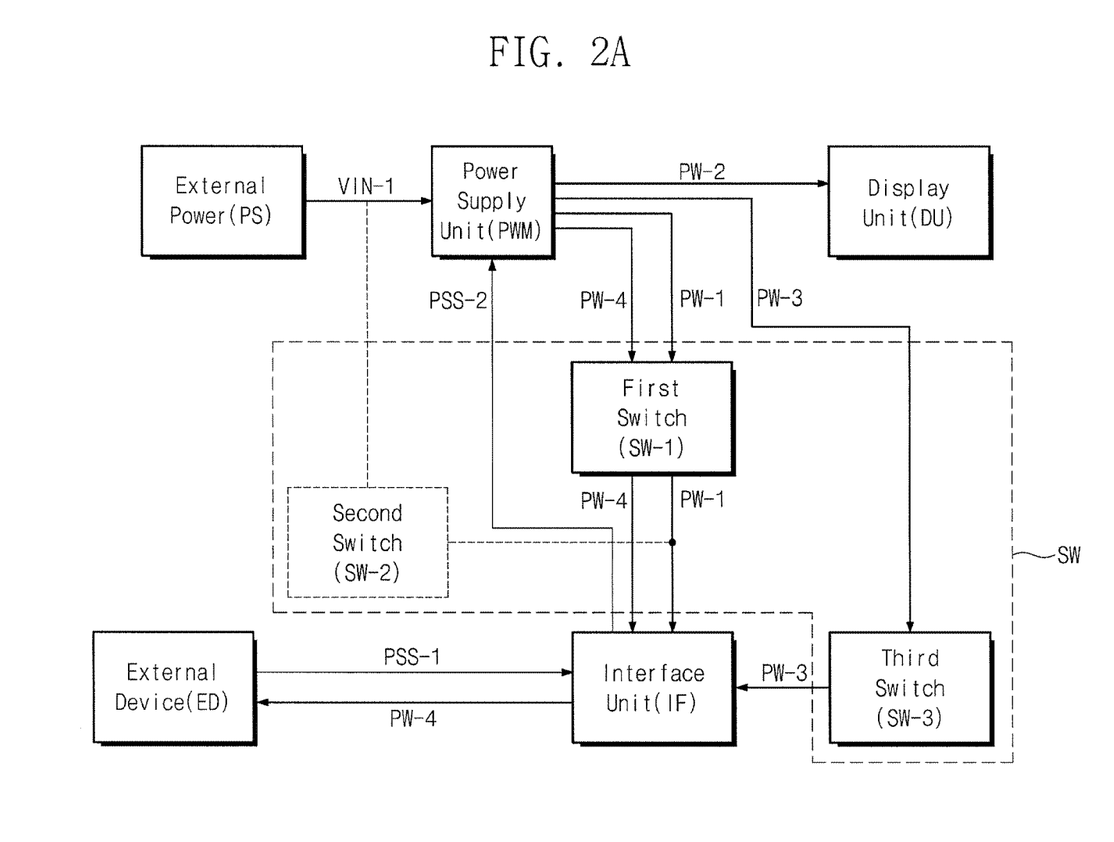
FIG. 2A illustrates an embodiment of power flow of a switching unit in a first mode.
Figure 2B:
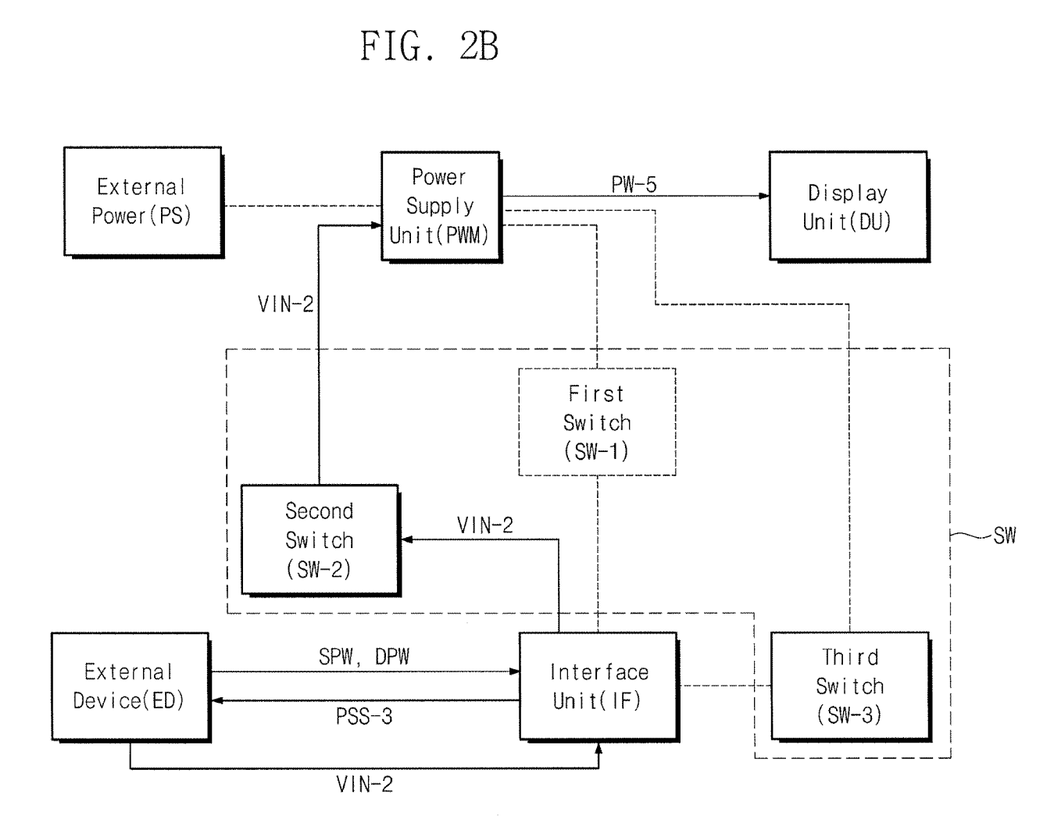
FIG. 2B illustrates an embodiment of power flow of the switching unit in a second mode.

FIG. 2A illustrates an embodiment of power flow of the switching unit SW in the first mode, and FIG. 2B illustrates an embodiment of power flow of the switching unit SW in the second mode.

Referring to FIGS. 2A, and 2B, the switching unit SW may include a first switch SW-1, a second switch SW-2, and a third switch SW-3. The first switch SW-1 may be between an output terminal of the power supply unit PWM and an input terminal of the interface unit IF. When the first power PW-1 generated from the first input power VIN-1 is output from the power supply unit PWM, the first switch SW-1 is turned on to form a first delivery path.

The switching unit SW may include a third switch SW-3 between the output terminal of the power supply unit PWM and the input terminal of the interface unit IF. The third switch SW-3, for example, may be turned on based on output from the power supply unit PWM of the third power PW-3 for starting the operation of the interface unit IF and form a third delivery path.

The switching unit SW may include a second switch SW-2 between the output terminal of the interface unit IF and the input terminal of the power supply unit PWM. The second switch SW-2 may be turned on to form a second delivery path for delivering the second input power VIN-2 (delivered from an external device ED to the interface unit IF) to the power supply unit PWM.

Referring to FIG. 2A, in the first mode, when the power supply unit PWM receives the first input power VIN-1 from an external power supply, a first power PW-1, a second power PW-2, and a third power PW-3 may be generated from the first input power VIN-1 and outputted.

For example, when the third power PW-3 is output from the power supply unit PWM, the third switch SW-3 may form a third delivery path for delivering the third power PW-3 between the power supply unit PWM and the interface unit IF. The third power PW-3 may be delivered from the power supply unit PWM to the interface unit IF through the third delivery path. The interface unit IF may start to operate by the third power PW-3. The second power PW-2 may be output from the power supply unit PWM and delivered to the display unit DU. The display unit DU may be driven by the second power PW-2.

When the first power PW-1 is output from the power supply unit PWM, the first switch SW-1 may be turned on to form a first delivery path and the interface unit IF may be driven by the first power PW-1. When the interface unit IF is driven by the first power PW-1, the interface unit IF may receive image data and control data from the external device ED.

When the interface unit IF is driven by the first power PW-1, the interface unit IF may transmit and receive signals (including power information) to and from external device ED. For example, when the external device ED is connected, the interface unit IF may receive a signal (including information on the power state of the external device ED) from the external device ED. When the external device ED is in a state for charging, the external device ED may transmit a power supply signal PSS-1 for requesting a power supply for charging to the interface unit IF.

The interface unit IF may transmit the signal PSS-2, for requesting the power supply corresponding to the power supply signal PSS-1 from the external device ED, to the power supply unit PWM. The power supply unit PWM generates the fourth power PW-4 from the first input power VIN-1 in correspondence to the power supply request signal PSS-1 of the interface unit IF. The fourth power PW-4 is delivered to the interface unit IF through the first switch SW-1 as a power supply.

The interface unit IF may transmit the fourth power PW-4 to the external device ED through the connector CN (e.g., see FIG. 1). For example, in the first mode, when the interface unit IF is driven by the first power PW-1 from the power supply unit PWM, the interface unit IF may exchange power information with the external device ED (e.g., power information required by the external device ED according to the driving state of the external device ED, power information supplied to the external device ED from the display device DD, etc.) and deliver power corresponding to the exchanged signals to the external device ED.

In the second mode, the display device may receive predetermined power from an external device. For example, according to an embodiment, a power supply unit may not generate power at a plurality of levels for driving the display device DD unless the first input power VIN-1 is received from an external power supply. The first switch SW-1 and the third switch SW-3 may be turned off because a power supply unit may not generate the first power and the third power from the first input power, and the interface unit IF may be in a dead battery state in which its operation does not start.

At this time, an external device connected to a display device may transmit a signal including power information to the interface part IF. Since the interface unit IF is in the dead battery state, the external device ED may recognize the dead battery state of the interface unit IF based on no response from the interface unit IF in correspondence to the signal transmission including the power information.

Referring to FIG. 2B, the external device may deliver an operation start power SPW for starting the operation of the interface part IF and a drive power DPW for driving to the interface part IP. When the interface section IF is driven by operation start power SPW and drive power DPW, the interface section IF may transmit to the external device DD a request signal for requesting the second input power VIN-2 of more than a predetermined magnitude for driving the display device DD.

For example, as shown in FIG. 2B, when the external device ED is to supply the second input power VIN-2, the external device ED may deliver the second input power VIN-2 corresponding to request signal PSS-3 to the interface unit IF. When the second input power VIN-2 is received based on the request signal PSS-3, the interface unit IF may output the second input power VIN-2 toward the power supply unit PWM. At this time, the second switch SW-2 is turned on and may deliver the second input power VIN-2 from the interface unit IF to the power supply unit PWM. The power supply unit PWM may generate the fifth power PW-5 for driving the display unit DU from the second input power VIN-2, and may then output the fifth power PW-5 to the display unit DU.

When the external device ED is insufficient to supply the second input power VIN-2, the external device ED may transmit a signal (including information that the supply of the second input power VIN-2 is unavailable) to the interface unit IF in correspondence to the request signal PSS-3. As another example, the external device ED may supply maximum power (e.g., which is less than the second input power VIN-2 but is able to be supplied by the external device ED) or power set by default to the interface unit IF in correspondence to the request signal PSS-3. Both the first switch SW-1 and the second switch SW-2 may switch to an off state. However, the second switch SW-2 may switch to an on state, and thus may deliver the default power from the interface unit IF to the power supply unit PWM. When the default power is received, the power supply unit PWM may store it for charging.

When power less than the second input power VIN-2 is received, the interface unit IF may not receive image data from the external device ED or after receiving image data and control data, and thus may not deliver them to the display unit DU.

When exchanging signals including power information with the external device ED, the display device DD may receive appropriate power from the external device ED or deliver power to the external device ED according to the situation. The display device DD may therefore perform an appropriate operation according to the power state of the display device DD and an external device.

Figure 3:
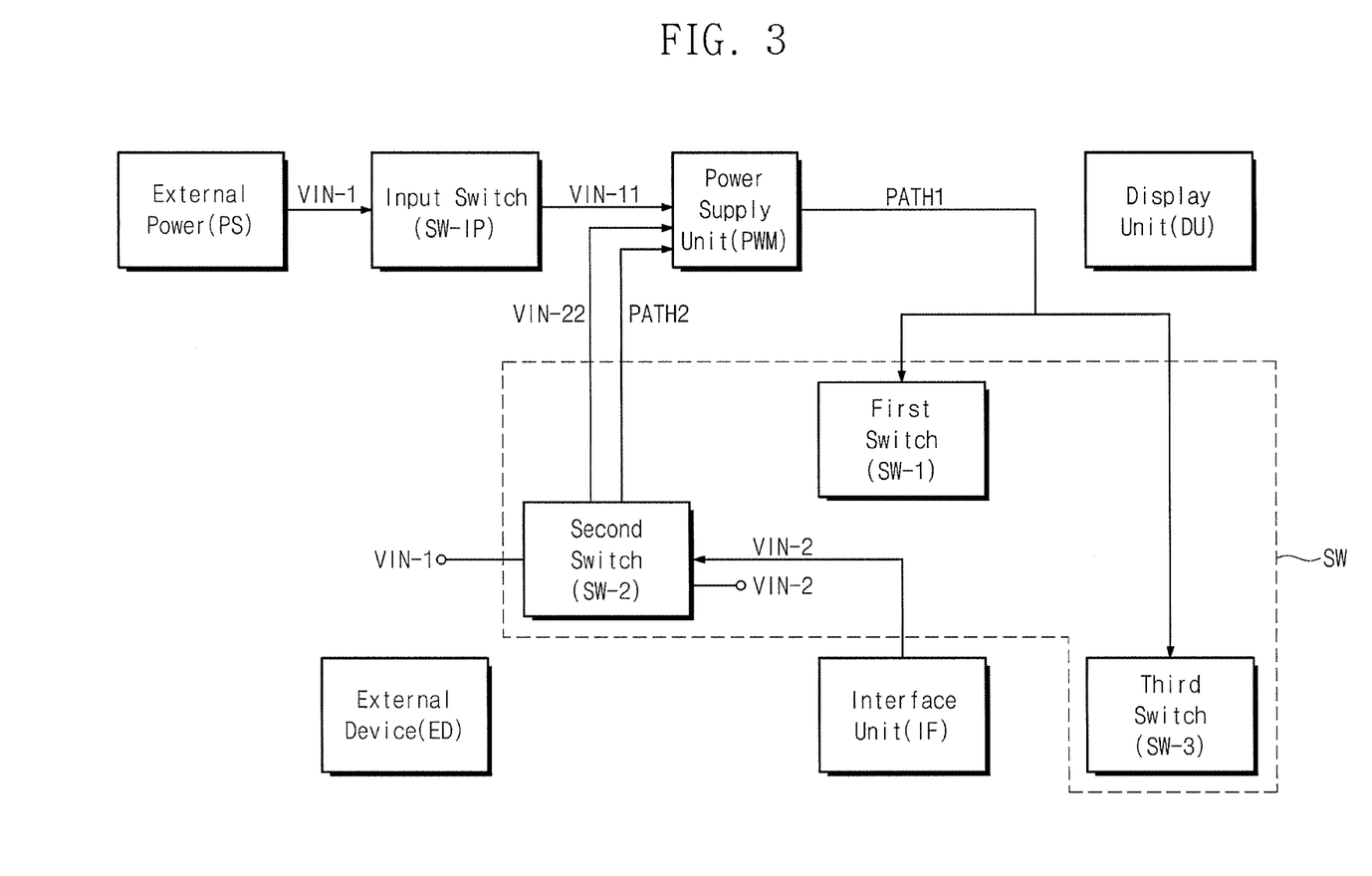
FIG. 3 illustrates an embodiment of a display device including an input switch.
Figure 4A:
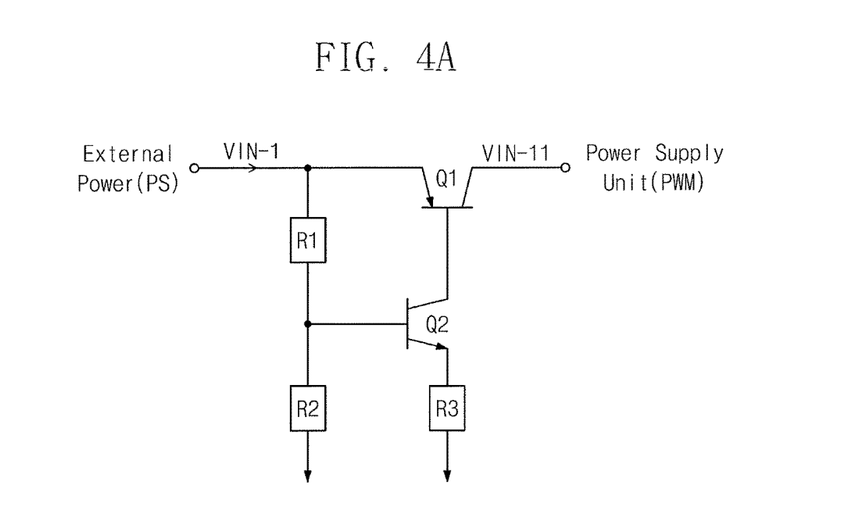
FIG. 4A illustrates an embodiment of the input switch and FIG. 4B illustrates an embodiment of another switch.
Figure 4B:
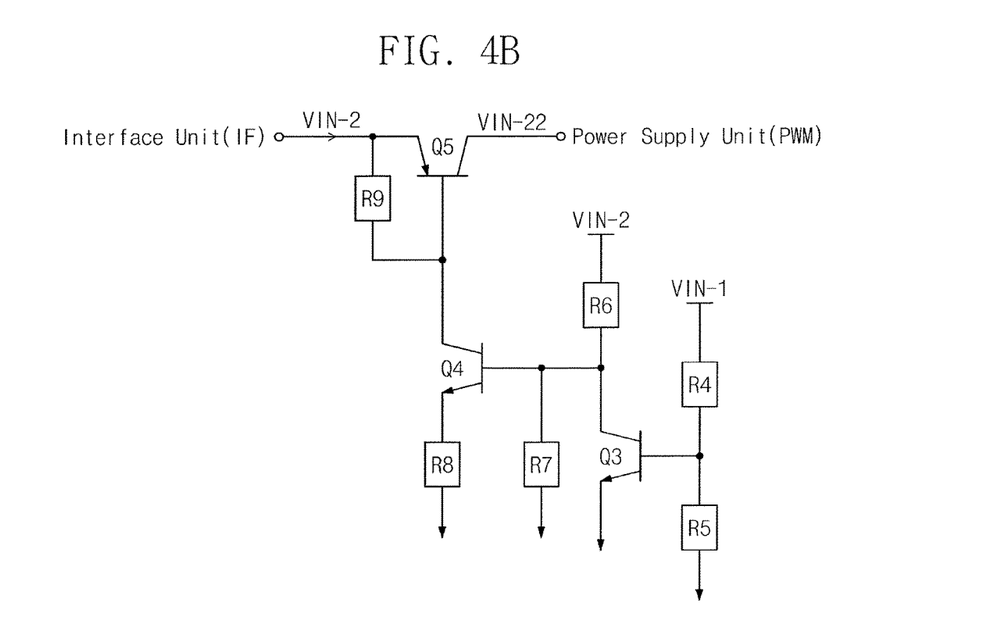

FIG. 3 illustrates another embodiment of a display device DD, and FIGS. 4A and 4B illustrate embodiments of element circuit diagrams including an input switch SW-IP and a second switch SW-2. This embodiment of display device DD may further include an input switch SW-IP between a terminal to which the first input power VIN-1 is supplied from an external power supply PS and an input terminal of the power supply unit PWM.

The input switch SW-IP may be turned on when the first input power VIN-1 is supplied from an external power supply. For example, the input switch SW-IP may be turned on in the first mode of the display device DD. The input switch SW-IP may receive the first input power VIN-1 and deliver a first pass input power VIN-11 based on the first input power VIN-1 to a power supply unit PWM. The switching unit SW forms a first delivery path PATH1 when the first pass input power VIN-11 is delivered from the input switch SW-IP to the power supply unit PWM.

The input switch SW-IP, for example, as shown in FIG. 4A, may include resistors having a predetermined size and bipolar junction transistors (BJTs). The input switch SW-IP may include a first resistor R1 connected to a terminal to which the first input power VIN-1 is supplied from the external power supply PS, a first transistor Q1 connected between the first resistor R1 and the input terminal of the power supply unit PWM, a second resistor R2 connected in series to the first resistor R1, a second transistor Q2 connected between a node between the first resistor R1 and the second resistor R2 and one end of the first transistor Q1, and a third resistor R3 connected between the second transistor Q2 and the ground.

For example, when the first input power VIN-1 is received from the external power supply PS, a voltage divided by the magnitudes of the first resistor R1 and the second resistor R2 may be applied to the second transistor Q2. The second transistor Q2 may switch to an on state by the third resistor R3 connected to the ground. When the second transistor Q2 switches to the on state, the first transistor Q1 switches to the on state. As a result, the first pass input power VIN-11 passing through the input switch SW-IP may be applied to the input terminal of the power supply unit PWM.

The second switch SW-2 may be turned on based on predetermined power delivered from the external device ED to the interface unit IF. The second switch SW-2, for example, may include, as shown in FIG. 3B, fourth to ninth resistors R4, R5, R6, R7, R8, and R9 and third to fifth transistors Q3, Q4, and Q5.

For example, a voltage according to the first input power VIN-1 may be applied to the fourth resistor R4 and the fifth resistor R5. The on/off operation of the third transistor Q3 may be controlled by a divided voltage value according to the magnitudes of the fourth resistor R4 and the fifth resistor R5. A voltage according to the second input power VIN-2 received from the external device ED may be applied to the sixth resistor R6. The on/off operation of the fourth transistor Q4 may be controlled by the sixth resistor R6, the seventh resistor R7, and the on/off state of the third transistor Q3. The ninth resistor R9 may be connected to the output terminal of the interface unit IF. The on/off state of the fifth transistor Q5 may be controlled according to the second input power VIN-2 from the interface unit IF and the on/off state of fifth transistor Q4.

For example, when the third transistor Q3 is turned on, the fourth transistor Q4 and the fifth transistor Q5 are turned off. As a result, the second switch SW-2 may be turned off. Additionally, when the third transistor Q3 is turned off, the fourth transistor Q4 and the fifth transistor Q5 are turned on. As a result, the second switch SW-2 may be turned on. When the second switch SW-2 is turned on after the second input power VIN-2 is received from the interface unit IF, second pass input power VIN-22 corresponding to the second input power VIN-2 may be delivered to the power supply unit PWM.

When the display device DD receives the first input power VIN-1 from the external power supply, the second input power VIN-2 may be received from the external device ED together. In this case, the second switch SW-2 is not turned on by the second input power VIN-2 and may maintain the turn-off state when the input switch SW-IP is in the turn-on state. For example, the second switch SW-2 may maintain the turn-off state when a voltage according to the first pass input power VIN-11 delivered by the input switch SW-IP is applied to the terminal of the second switch SW-2.

Therefore, when the second input power VIN-2 is received from the external device and the stable first input power VIN-1 is not received from the external power supply PS, the second switch SW-2 may form a second delivery path PATH2.

The first switch SW-1 and the third switch SW-3 may be implemented, for example, by a circuit with resistors of predetermined sizes and bipolar junction transistors, like the input switch SW-IP and the second switch SW-2. Unlike those shown in 4A and 4B, switches in the switching unit SW may be implemented, for example, by other elements such as a field effect transistor (FET).

Thus, in relation to the display device DD, when input power is received through various paths, a switching operation may be appropriately performed to allow the display device DD to operate by more stable power.

Figure 5:
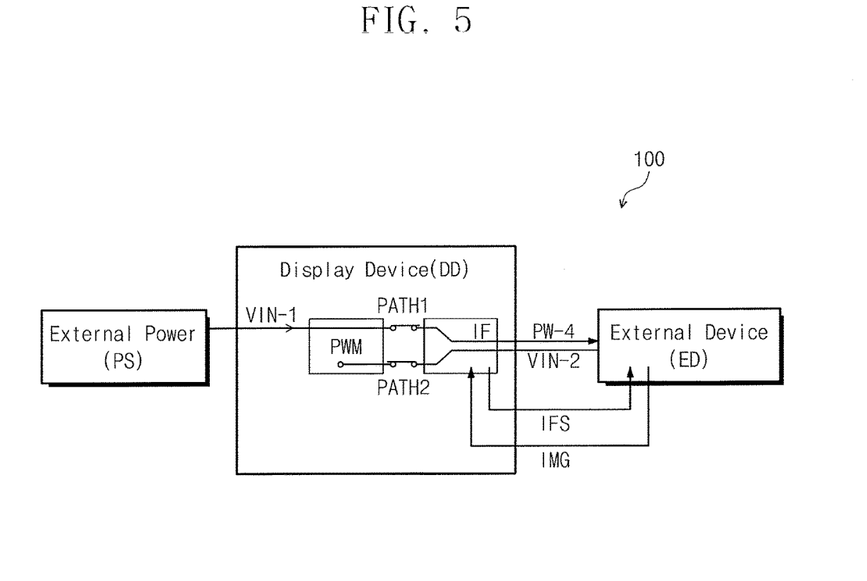
FIG. 5 illustrates an embodiment of a power delivery system.

FIG. 5 illustrates an embodiment of a power delivery system 100 including a display device DD. Referring to FIG. 5, the power delivery system 100 may include the display device DD, which includes, for example, the power supply unit PWM, the interface unit IF, the switching unit SW, and the display unit DU in FIG. 1. An external power supply PS supplies the first input power VIN-1 to the display device DD. An external device ED supplies image data IMG and a predetermined power to the display device DD.

When the first input power VIN-1 is supplied from the external power supply PS, the display device DD may form only the first delivery path PATH1 by switching the first switch to an on state. The interface unit IF of the display device DD may supply the fourth power PW-4, which is generated from the first input power VIN-1, from the power supply unit PWM to the external device ED based on signals including power information exchanged with the external device ED.

When the first input power VIN-1 is not supplied from the external power supply PS, the display device DD may turn off the first switch SW-1 and turn on the second switch SW-2 to form only the second delivery path PATH2. When the second delivery path PATH2 is formed, the interface unit IF may transmit a signal including the power-related information to the external device ED and receive the second input power VIN-2 from the external device ED. Then, the interface unit IF may deliver the second input power VIN-2 to the power supply unit PWM.

In relation to the display device DD, a main board may be omitted for converting the image data IMG from the external device ED to match the driving interface specification of the display device DD. When the external device ED is connected to the display device DD, the external device ED may receive IFS information on the driving interface from the display device DD, and convert the image data IMG to match the driving interface of the display device DD, in order to transmit the converted image data IMG to the display device DD.

Figure 6A:
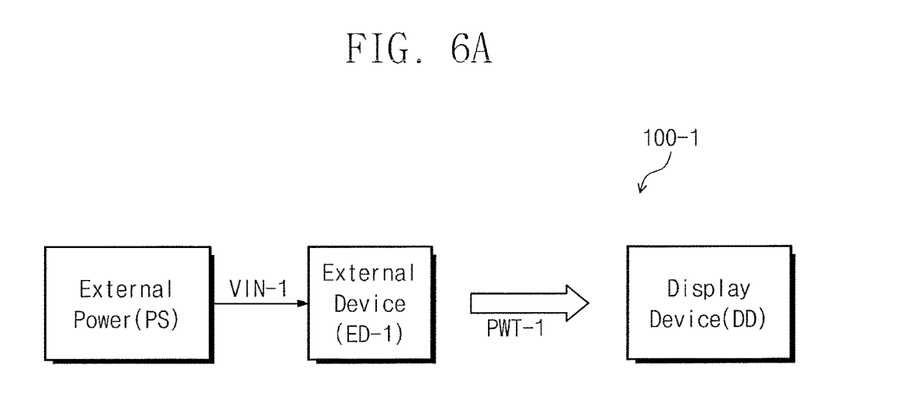
FIGS. 6A and 6B illustrate views other embodiments of power delivery systems.
Figure 6B:
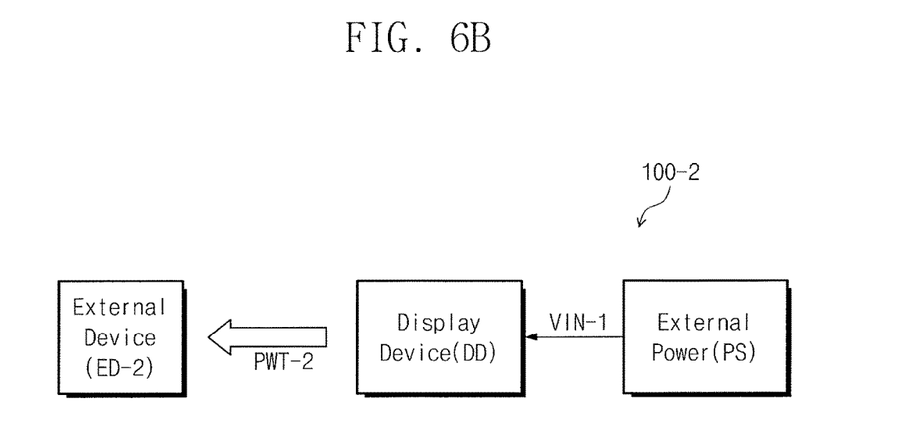

FIGS. 6A and 6B illustrating additional embodiments of a power delivery system 100-1 and 100-2 including a display device DD for transmitting and receiving power of more than a predetermined magnitude. The display device DD may include a connector including a plurality of terminals for power and data transmission. The connector may transmit or receive input power of more than a predetermined magnitude to or from an external device.

Referring to FIG. 6A, when the external device ED-1 that receives the first input power VIN-1 of more than a predetermined magnitude from the external power supply PS is connected, the display device DD may receive the first input power VIN-1 from an external device ED-1. For example, the display device DD may receive the first delivery power PWT-1 from the external device ED-1 through the connector, without directly receiving the first input power VIN-1 from the external power supply PS. The first delivery power PWT-1 may have the same magnitude as the first input power VIN-1.

Referring to FIG. 6B, the display device DD may directly receive the first input power VIN-1 from the external power supply PS. At this time, when the external device ED-2 is connected to the connector, the second delivery power PWT-2 having the same magnitude as the first input power VIN-1 may be transmitted to external device ED-2.

In such a manner, the display device DD may receive input power for overall driving of the display device DD from various devices using a connector that transmits power of more than a predetermined magnitude. In addition, the display device DD may supply power of more than a predetermined magnitude for driving an external device to the external device connected to a connector.

In accordance with one or more of the aforementioned embodiments, when stable power is supplied from an external power supply, power is supplied from the external power supply. When power is not supplied from the external power supply, power for driving a display device may be supplied using a connector that is to deliver power of more than a predetermined magnitude from a connected external device. Thus, a display device may appropriately receive power for driving the display device regardless of a path through which external power is supplied to the display device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A display device, comprising:
    an interface to be driven by a driving power and to receive image data from an external source;
    a power supply to generate first power and second power based on a first input power in a first mode, the power supply to supply the first power as the driving power to the interface, the first input power to be received from an external power supply in the first mode; and
    a switch arrangement to form a first delivery path to deliver the first power from the power supply to the interface in the first mode and to form a second delivery path to deliver a second input power to the power supply in a second mode when the interface receives the second input power from the external source, the driving power to be received from the external source in the second mode, wherein the switch arrangement includes:
        a first switch between an output terminal of the power supply and an input terminal of the interface, the first switch to be turned on in the first mode to form the first delivery path,
        a second switch between an output terminal of the interface and an input terminal of the power supply, the second switch to be turned on in the second mode to form the second delivery path, and
        a third switch to form a third delivery path; and
    a display to receive the second power from the power supply and to be driven in the first mode and receive the image data from the interface to display an image, wherein
    the interface is to start an operation based on an operation start power;
    the power supply to generate a third power from the first input power in the first mode; and
    the third switch to deliver the third power as the operation start power to the interface when the third switch is turned on.

2. The display device as claimed in claim 1, wherein:
    when an operation starts based on the third power, the interface is to receive a power supply signal from the external source and request a power supply corresponding to the power supply signal from the power supply;
    the power supply is to generate a fourth power from the first input power and deliver the fourth power as the power supply to the interface through the first delivery path; and
    the interface is to deliver the fourth power to the external source.

3. The display device as claimed in claim 1, wherein the third switch is to be turned off and the interface is to receive the operation start power from the external source in the second mode.

4. The display device as claimed in claim 3, wherein the interface is to be driven based on the driving power from the external source in the second mode and is to transmit a request signal to request the second input power to the external source.

5. The display device as claimed in claim 4, wherein:
    when the second input power is provided from the external source to the interface based on the request signal, the power supply is to generate a fifth power from the second input power received through the second delivery path and the display is to be driven based on the fifth power from the power supply.

6. The display device as claimed in claim 4, wherein:
    when the interface receives a default power less than the second input power based on the request signal, the first switch and the second switch are to be turned off.

7. The display device as claimed in claim 1, further comprising:
    an input switch to be turned on in the first mode,
    wherein the second switch is to be turned off when the input switch is turned on, even when the second switch receives the second input power from the external source in the first mode.

8. The display device as claimed in claim 1, wherein the interface includes:
    a connector to electrically connect the external source and the interface, the connector including at least one terminal to receive the driving power and the second input power, and
    a terminal to receive the image data.

9. A power delivery system, comprising:
    an external power supply to supply a first input power;
    an external source to provide image data; and
    a display including:
        a power supply to generate a first power and a second power from the first input power in a first mode, to receive the first input power from the external power supply,
        an interface to be driven by a driving power and to receive the image data from the external source,
        a switch arrangement to form a first delivery path to deliver the first power as the driving power from the power supply to the interface in the first mode and to form a second delivery path to deliver a second input power to the power supply in a second mode when the interface receives the second input power from the external source, wherein the switch arrangement includes
            a first switch between an output terminal of the power supply and an input terminal of the interface, the first switch to be turned on in the first mode to form the first delivery path;
            a second switch between an output terminal of the interface and an input terminal of the power supply, the second switch to be turned on in the second mode to form the second delivery path, and
            a third switch to form a third delivery path, wherein the display is to receive the second power from the power supply and to be driven in the first mode and receive the image data from the interface to display an image;

the interface is to start an operation by an operation start power;

the power supply is to generate a third power from the first input power in the first mode; and the third switch is to deliver the third power as the operation start power to the interface when the third switch is turned on.

10. The power delivery system as claimed in claim 9, wherein:

when an operation starts based on the third power, the interface is to receive a power supply signal from the external source and is to request a power supply corresponding to the power supply signal from the power supply;

the power supply is to generate a fourth power from the first input power and to deliver the fourth power as the power supply to the interface through the first delivery path; and the interface is to deliver the fourth power to the external source.

11. The power delivery system as claimed in claim 9, wherein the third switch is to be turned off and the interface is to receive the operation start power from the external source in the second mode.

12. The power delivery system as claimed in claim 11, wherein the interface is to be driven by the driving power from the external source in the second mode and is to transmit a request signal to request the second input power to the external source.

13. The power delivery system as claimed in claim 12, wherein:

the external source is to deliver the second input power to the interface based on the request signal;

the second switch is to be turned on to deliver the second input power from the interface to the power supply; and the power supply is to generate a fifth power to drive the display based on the second input power.

14. The power delivery system as claimed in claim 9, wherein:

the interface is to electrically connect the external source and the interface, and the interface includes a connector having a terminal to receive the image data from the external source and at least one terminal to receive the driving power and the second input power.

15. The power delivery system as claimed in claim 9, wherein:

when connected to the display, the external source is to receive driving interface information of the display and to transmit data, which is converted to match the driving interface information, as the image data to the display.

* * * * *